Patented Dec. 16, 1941

2,266,601

UNITED STATES PATENT OFFICE 2,266,601

TREATMENT OF RUBBER

Louis H. Howland, Nutley, N. J., assignor, by mesne assignments, to United States Rubber Company, New York, N. Y., a corporation of New Jersey No Drawing. Application September 11, 1937, Serial No. 163,437

15 Claims. (Cl. 260—808)

This invention relates to the treatment of rubber and similar oxidizable materials, and more particularly to a new class of deterioration retarders.

An object of the invention is to provide a new class of anti-oxidants or age resisters for organic substances which tend to deteriorate by absorption of oxygen from the air, for example goods of rubber or allied gums, unsaturated fatty oils such as unsaturated vegetable oils, essential oils, petroleum oils and their derivatives such as gasolines, soaps, aldehydes, synthetic resins, and the like. Further objects will be apparent from the following description.

According to the invention the organic substance is treated with a small proportion of an age resister having the general formula

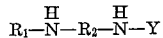

where $R_1$ is an aryl group; $R_2$ is an arylene group; and Y is a carbamyl group (substituted or unsubstituted). For the purposes of this invention, each of the materials of the class is referred to broadly as a carbamyl derivative of an amino-diarylamine, wherein the aforesaid carbamyl group is directly attached to the amino-nitrogen atom as described, and wherein either or both of the aromatic nuclei may contain additional substituents. The materials may be made by any of the methods known in the art; for example, by the reaction of a carbamyl halide on a primary-amino-substituted diarylamine.

By "an aryl group" herein is meant an aromatic hydrocarbon radical, whether further substituted or not in the nucleus, and having a free valence which belongs to the nucleus.

The following examples are given to illustrate the invention and are not to be construed as limiting thereof (the parts are by weight):

Example 1.—21 grams of p-amino-diphenyl-amine are heated for 1½ hours with an excess over the molecular equivalent of urea, at 150° C., with evolution of ammonia gas. The reaction mass preferably is agitated while heating. When reaction has ceased the molten mass is then poured in water while agitating and the precipitate is washed with hot water and dried. The product has a melting point of about 190° C. and is believed to have the formula

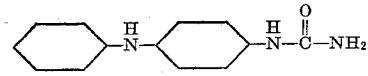

It may be called p-anilino-phenyl urea.

Example 2.—23 grams of p-amino-phenyl p-tolyl-amine are dissolved in 200 cc. of benzol. 17 grams of phenyl mustard oil are added. On standing a gray powder separates which may be separated by filtering. It may be washed with benzol and dried. Its melting point is about 170–171° C. and it is believed to have the formula—

It may be called p-(p-tolylamino) diphenyl thiourea.

Example 3.—¼ mole of p-amino-phenyl p-tolyl amine is refluxed for 72 hours with an excess over ¼ mole of carbon bisulfide in 300 c. c. of alcohol containing a pinch of sulphur and 2 grams of potassium hydroxide. The reaction mix is then poured into water and the precipitate after separation may be purified by several successive extractions with dilute hydrochloric acid and dilute ammonia, and finally washing with water, and drying. The product thus prepared may be used as such or further purified. It is believed to have the following formula:

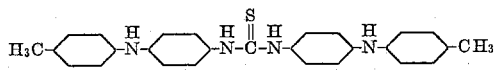

which may be called p,p' di (p-tolylamino) diphenyl thiourea.

Example 4.—The following stocks A, B and C were made up, vulcanized for various times as indicated, and tested before and after ageing. In the table below T represents tensile strength at break in lbs./sq. in., and E is percent ultimate elongation.

Mix A contains 100 parts of smoked sheet rubber, 42 parts of carbon black, 10 parts of zinc oxide, 3.5 parts of pine tar, 1.25 parts of stearic acid, 3.25 parts of sulfur, 1.25 parts of hexamethylenetetramine, 0.35 part of diphenyl guanidine and 1 part of Example 1 product.

Mix B contains 100 parts of pale crepe rubber, 20 parts of zinc oxide, 50 parts of lithopone, 3 parts of sulfur, 1.0 part of heptaldehyde-aniline, and 1.0 part of Example 2 product.

Mix C contains 100 parts of pale crepe rubber, 3 parts of zinc oxide, 5 parts of titanium oxide, 3 parts of sulfur, 0.8 part of heptaldehyde-aniline and 1.0 part of Example 3 product.

Each of the stocks was tested along with a corresponding control sample but omitting the age-resister material.

Stock A and its control were vulcanized in a mold for 60 and 75 minutes respectively at 45 lbs./sq. in. steam pressure. Portions of the resulting stocks were aged 168 hours in the oxygen bomb (oxygen pressure—300 lbs./sq. in.) at 60° C., and other portions were aged in air 48 hours at 100° C.

Stock B and its control were vulcanized in a mold for 30 and 60 minutes respectively at 40 lbs./sq. in. steam pressure. Portions of the resulting stocks were aged in the oxygen bomb for 144 hours, and other portions were aged three weeks in air (the Geer oven) at 70° C.

Stock C and its control were vulcanized in a mold for 30 and 60 minutes respectively at 40 lbs./sq. in steam pressure. Portions of the resulting stocks were aged 216 hours in the oxygen bomb, and other portions were aged 4 weeks in the Geer oven at 70° C.

| Cure | Control | | Stock A | | Stock B | | Stock C | |
|---|---|---|---|---|---|---|---|---|
| | T | E | T | E | T | E | T | E |
| Unaged: | | | | | | | | |
| 60' at 45#  | 4,327 | 690 | 4,267 | 650 | | | | |
| 75' at 45#  | 4,217 | 650 | 4,268 | 630 | | | | |
| Aged 168 hrs. in oxygen: | | | | | | | | |
| 60' at 45#  | 1,257 | 290 | 2,265 | 410 | | | | |
| 75' at 45#  | 1,148 | 260 | 2,090 | 370 | | | | |
| Aged 48 hrs. at 100° C.: | | | | | | | | |
| 60' at 45#  | 1,850 | 480 | 2,817 | 450 | | | | |
| 75' at 45#  | 1,662 | 440 | 2,653 | 420 | | | | |
| Unaged: | | | | | | | | |
| 30' at 45#  | 3,588 | 720 | | | 3,272 | 710 | | |
| 60' at 45#  | 3,332 | 700 | | | 3,180 | 680 | | |
| Aged 144 hrs. in oxygen: | | | | | | | | |
| 30' at 40#  | Melted | | | | 2,822 | 620 | | |
| 60' at 40#  | Melted | | | | 2,324 | 550 | | |
| Aged 3 weeks at 158° F.: | | | | | | | | |
| 30' at 40#  | 2,183 | 720 | | | 3,409 | 660 | | |
| 60' at 40#  | 1,660 | 570 | | | 2,733 | 570 | | |
| Unaged: | | | | | | | | |
| 30' at 40#  | 3,907 | 700 | | | | | 3,977 | 710 |
| 60' at 40#  | 3,505 | 670 | | | | | 3,577 | 690 |
| Aged 216 hrs. in oxygen: | | | | | | | | |
| 30' at 40#  | Melted | | | | | | 3,296 | 640 |
| 60' at 40#  | Melted | | | | | | 2,616 | 580 |
| Aged 4 wks. at 158° F.: | | | | | | | | |
| 30' at 40#  | 1,825 | 610 | | | | | 3,421 | 660 |
| 60' at 40#  | 1,019 | 470 | | | | | 2,461 | 570 |

The scope of this invention includes the use, as described herein, of carbamyl derivatives of primary-secondary aromatic amines among which amines are 4-amino diphenylamine; the 4-amino-phenyl toluidines; the 4-amino-phenyl xylidines; 4-amino-phenyl cumidines; 4-amino-4'-tertiary amyl-diphenylamine; 4-amino-4'-dodecyl diphenylamine; 4-amino-4'-hexadecyl diphenylamine; 4 - amino - phenyl carvacryl amine; 4-amino-3-methyl diphenylamine; 4-amino-2-methyl-4'-tertiary butyl diphenylamine; 4-amino-phenyl phenetidine; 4-amino-4'-ethoxy-2'-methyl diphenylamine; 4-amino-2-ethyl-3'-propoxy diphenylamine; 4-amino-4'-dodecyloxy diphenylamine; 4-amino-4'-hexadecyloxy diphenylamine; 4-amino-4'-(butylmercapto)-diphenylamine; 4-amino-4'-(amyl - selenyl) - diphenylamine; 1-amino-4-phenylamino naphthalene and other amino arylamino naphthalenes; the 4-amino-phenyl naphthylamines; 4-aminotolyl naphthylamines; N-(p-amino-phenyl)-1-methyl-beta-naphthylamine; 4-amino-4'-toluidino diphenyl; 4-amino-4'-dimethylamino-diphenylamine; 4-amino-4'-diamylamino-diphenylamine; 4-amino-4'-morpholyl-diphenylamine; 4-amino-4'-piperidyl-diphenylamine; 4-amino-4'- dodecylamino - diphenylamine; 4-amino-4'-anilino-diphenylamine; 4-amino-4'-hydroxy-diphenylamine; N-(4-amino - phenyl)-N'-(4-hydroxyl-phenyl)-p-phenylene diamine; N-(4-amino - phenyl) - N'- (4-alkoxy-phenyl)-p-phenylene diamine; N-(4-amino-phenyl)-N'-(4-butyl-mercapto phenyl)-p-phenylenediamine; 4,4'-diamino - diphenylamine; N,N' - di - (4-aminophenyl)-p-phenylene diamine; and the metaamino-phenyl aryl amines.

Examples of carbamyl groups, representative of Y in the formula, and which may be substituted upon the primary amino nitrogen in any of the aforementioned amino diarylamines, include carbamyl (—CO—NH$_2$); N-methylene carbamyl (—CO—N=CH$_2$) and other N-alkylidene carbamyls, aralkylidene carbamyls, etc.; methyl carbamyl; allyl carbamyl; tertiary amyl carbamyl; benzyl carbamyl; cyclohexyl carbamyl; didodecyl carbamyl; methyl hexadecyl carbamyl; pentamethylene carbamyl; phenyl carbamyl; diphenyl carbamyl; p-tertiary amyl phenyl carbamyl; dicumyl carbamyl; dianisyl carbamyl; p-anilino-phenyl carbamyl; phenetidyl cumyl carbamyl; 4-butyl mercapto-phenyl, tolyl carbamyl; and the carbamyl groups derived from pyrrolidine, hydrogenated quinolines, carbazol, hydrogenated acridines, acridones, morpholine, piperazine, dimethyl acridan, by replacement of the amine hydrogen of such secondary bases by carbonyl (—C=O); the thiocarbamyl groups corresponding to all of the above, in which the oxygen of the carbamyl is replaced by sulfur; the guanyl groups corresponding to the above, in which an imino group or substituted imino group replaces the oxygen of carbamyl, for example, alkyl, aralkyl-, aryl-, etc. substituted guanyl groups; biguanyl and substituted biguanyl groups; amino carbamyl, amino thiocarbamyl, phenyl amino thiocarbamyl, and substituted amino carbamyl and thiocarbamyl in general—all being substituted carbamyl groups. The groups of the type of amino-carbamyl, when replacing Y in the formula presented above, give arylamino-aryl semicarbazides and arylamino-aryl thio-semicarbazides.

The various carbamyl derivatives may be used in conjunction with other types of anti-oxidants, for example the ketone-diarylamine reaction products, such as acetone-diphenylamine, acetone-aniline, and their homologues and analogues.

The invention may be applied to the preservation of natural rubber compositions, as well as artificially-prepared rubber compositions, including reclaimed rubbers, and latices of such rubber compositions.

It is also to be understood that other desired filling and compounding ingredients may be incorporated along with the preservative, for example, in the case of rubber, there may be incorporated other accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the anti-oxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surfaces of vulcanized or unvulcanized rubber goods.

Having thus described my invention, what I claim and desire to protect by Letters Patent is:

1. A process of preserving organic substances which tend to deteriorate by absorption of oxygen from the air which comprises incorporating therewith an anti-oxidant which is a carbamyl-amino diarylamine having the carbamyl group directly attached to the primary amino nitrogen atom of the amino diarylamine.

2. A process of preserving organic substances which tend to deteriorate by absorption of oxygen from the air which comprises incorporating therewith an anti-oxidant having the general formula—

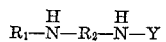

where $R_1$ is an aryl group; $R_2$ is an arylene group; and Y is a carbamyl group.

3. A process of preserving organic substances which tend to deteriorate by absorption of oxygen from the air which comprises incorporating therewith an anti-oxidant having the general formula

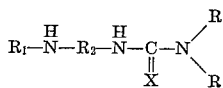

where $R_1$ is an aryl group; $R_2$ is an arylene group; X is a member of the group consisting of oxygen and sulphur, and R is a member of the group consisting of hydrogen and hydrocarbon radicals.

4. A process of preserving organic substances which tend to deteriorate by absorption of oxygen from the air which comprises incorporating therewith an anti-oxidant which is a carbamyl-amino diarylamine in which the nitrogen of the carbamyl group carries a hydrocarbon substituent.

5. A process of preserving organic substances which tend to deteriorate by absorption of oxygen from the air which comprises incorporating therewith a carbamyl-amino diphenylamine having the carbamyl group directly attached to the primary amino nitrogen atom of the amino diphenylamine.

6. A process of preserving organic substances which tend to deteriorate by absorption of oxygen from the air which comprises incorporating therewith a p-anilino phenyl urea.

7. A process of preserving organic substances which tend to deteriorate by absorption of oxygen from the air which comprises incorporating therewith a carbamyl-amino-phenyl tolylamine having the carbamyl group directly attached to the primary amino nitrogen atom of the amino-phenyl tolylamine.

8. A process of preserving organic substances which tend to deteriorate by absorption of oxygen from the air which comprises incorporating therewith a thiocarbamyl-amino-phenyl tolylamine having the thiocarbamyl group directly attached to the primary amino nitrogen atom of the amino-phenyl tolylamine.

9. A process of preserving organic substances which tend to deteriorate by absorption of oxygen from the air which comprises incorporating therewith a para (para-tolylamino) N,N' diphenyl thiourea.

10. A process of preserving organic substances which tend to deteriorate by absorption of oxygen from the air which comprises incorporating therewith para (para-tolylamino) N,N' diphenyl thiourea.

11. A process of preserving organic substances which tend to deteriorate by absorption of oxygen from the air which comprises incorporating therewith p,p'di(p-tolylamino) N,N' diphenyl thiourea.

12. A composition comprising rubber and a carbamyl-amino diarylamine having the carbamyl group directly attached to the primary amino nitrogen atom of the amino diarylamine.

13. A composition comprising rubber and a carbamyl-amino diarylamine in which the nitrogen of the carbamyl group carries a hydrocarbon substituent.

14. A composition comprising rubber and a carbamyl-amino diphenylamine having the carbamyl group directly attached to the primary amino nitrogen atom of the amino diphenylamine.

15. A composition comprising rubber and a thiocarbamyl-amino-phenyl tolylamine having the thiocarbamyl group directly attached to the primary amino nitrogen atom of the amino-phenyl tolylamine.

LOUIS H. HOWLAND.